(12) United States Patent
Appel et al.

(10) Patent No.: US 11,534,920 B2
(45) Date of Patent: Dec. 27, 2022

(54) TRANSFER APPARATUS AND TRANSFER METHOD

(71) Applicant: TVI Entwicklung & Produktion GmbH, Irschenberg (DE)

(72) Inventors: Maximilian Appel, Petersthal (DE); Thomas Völkl, Bruckmühl (DE)

(73) Assignee: TVI ENTWICKLUNG & PRODUKTION GMBH, Irschenberg (DE)

( * ) Notice: Subject to any disclaimer, the term of this patent is extended or adjusted under 35 U.S.C. 154(b) by 445 days.

(21) Appl. No.: 16/717,315

(22) Filed: Dec. 17, 2019

(65) Prior Publication Data
US 2020/0262076 A1 Aug. 20, 2020

(30) Foreign Application Priority Data
Dec. 18, 2018 (DE) .......................... 102018132655.6

(51) Int. Cl.
| B25J 9/16 | (2006.01) |
| B25J 13/08 | (2006.01) |
| B25J 9/00 | (2006.01) |
| B25J 9/04 | (2006.01) |
| B25J 9/12 | (2006.01) |
| B25J 11/00 | (2006.01) |
| B25J 15/02 | (2006.01) |
| B25J 19/02 | (2006.01) |

(52) U.S. Cl.
CPC ........... B25J 9/1679 (2013.01); B25J 9/0009 (2013.01); B25J 9/04 (2013.01); B25J 9/12 (2013.01); B25J 11/0045 (2013.01); B25J 13/088 (2013.01); B25J 15/0206 (2013.01); B25J 19/021 (2013.01)

(58) Field of Classification Search
CPC . B25J 9/1679; B25J 9/0009; B25J 9/04; B25J 9/12; B25J 11/0045; B25J 13/088; B25J 15/0206; B25J 19/021
USPC ................. 700/245–264; 318/568.11–568.25
See application file for complete search history.

(56) References Cited

U.S. PATENT DOCUMENTS 3,559,256 A * 2/1971 Lemelson ........ G05B 19/41815
83/76.3
4,525,071 A * 6/1985 Horowitz ................ B29B 7/728
700/226
(Continued)

FOREIGN PATENT DOCUMENTS

| DE | 3333301 A1 | 3/1985 |
| DE | 4208818 A1 | 9/1993 |

(Continued)

OTHER PUBLICATIONS

Extended European Search Report dated May 13, 2020, Application No. EP 19 21 2346, 2 Pages.

Primary Examiner — Jaime Figueroa
(74) Attorney, Agent, or Firm — Brooks Kushman P.C.

(57) ABSTRACT

A transfer system in the form of a robot line used in one embodiment to transfer products, such as slices of meat or other fresh food, while complying with the hygienic requirements. The robot line may transfer the products, simply and with little constructive and financial effort. The robots used for this purpose may be very simply constructed with only one swivel arm and the robot base may be guided below the working plane, and only the swivel arm and the gripper may be disposed above the working plane.

18 Claims, 2 Drawing Sheets

(56) References Cited

U.S. PATENT DOCUMENTS

| | | | | |
|---|---|---|---|---|
| 4,852,237 A * | 8/1989 | Tradt | | B62D 65/06 29/709 |
| 5,087,169 A * | 2/1992 | Tubke | | B65G 61/00 414/744.5 |
| 5,570,992 A * | 11/1996 | Lemelson | | G05B 19/14 901/41 |
| 5,744,357 A * | 4/1998 | Wang | | B29D 11/00259 264/1.32 |
| 5,896,297 A * | 4/1999 | Valerino, Sr. | | G05B 19/41895 700/218 |
| 5,911,449 A * | 6/1999 | Daniele | | B21G 1/08 29/33 P |
| 6,081,981 A * | 7/2000 | Demarest | | A61B 17/06004 29/430 |
| 6,522,777 B1 * | 2/2003 | Paulsen | | G01B 11/2518 356/243.1 |
| 6,708,385 B1 * | 3/2004 | Lemelson | | B23Q 7/03 29/563 |
| 6,898,484 B2 * | 5/2005 | Lemelson | | G05B 19/19 700/262 |
| 7,370,456 B2 * | 5/2008 | Ichikawa | | B65B 35/44 53/445 |
| 7,819,260 B2 * | 10/2010 | Leimbach | | B65G 1/14 211/24 |
| 10,635,758 B2 * | 4/2020 | Pivac | | B28D 1/10 |
| 2002/0014577 A1 * | 2/2002 | Ulrich | | G03F 7/70483 257/E21.001 |
| 2003/0208302 A1 * | 11/2003 | Lemelson | | G05B 19/19 700/245 |
| 2004/0000121 A1 * | 1/2004 | Ichikawa | | B65B 5/06 53/238 |
| 2006/0088405 A1 * | 4/2006 | Leimbach | | B65G 1/16 211/24 |
| 2008/0167817 A1 * | 7/2008 | Hessler | | G01C 21/005 701/514 |
| 2008/0202068 A1 * | 8/2008 | Ichikawa | | B65B 43/285 53/147 |
| 2018/0022557 A1 | 1/2018 | Tanaka et al. | | |
| 2019/0316369 A1 * | 10/2019 | Pivac | | B25J 9/1635 |

FOREIGN PATENT DOCUMENTS

| | | |
|---|---|---|
| DE | 102016105570 A1 | 9/2017 |
| DE | 10 2016 108 003 A1 | 11/2017 |
| EP | 266056 A1 | 5/1988 |
| EP | 1092512 A2 | 4/2001 |
| WO | 2009112050 A1 | 9/2009 |
| WO | 2018/175902 A1 | 9/2018 |

* cited by examiner

TRANSFER APPARATUS AND TRANSFER METHOD

CROSS-REFERENCE TO RELATED APPLICATIONS

This application claims priority to German Patent Application No. 102018132655.6 filed on Dec. 18, 2018 to Maximilian Appel and Thomas Völkl, currently pending, the entire disclosure of which is incorporated herein by reference.

FIELD OF THE INVENTION

The invention relates to a transfer system which, by means of one or more robots, transfers products from a picking surface to a depositing surface, such as is frequently used in the field of packaging technology as a so-called robot line to transfer delivered products, often into containers, so-called trays. The invention also concerns a transfer method for operating a transfer system.

BACKGROUND OF THE INVENTION

In practice, the picking surface is often moved in the direction of travel, in particular it is moved always and preferably continuously, as it is the upper side of a product conveyor that delivers the products from, for example, a production line.

The supports to be covered with the products, for example flat boards or trays to be filled or cavity to be filled, formed in a film web by a thermoforming packaging machine, are often delivered and/or removed parallel to the transport direction of the product conveyor, preferably in the same direction as the products on the product conveyor. The products are either constantly moving on a tray conveyor or temporarily stopped or the cavities are temporarily stopped during intermittent operation of a thermoforming packaging machine.

Several robots are mounted one behind the other in the direction of travel at fixed positions in the transfer system, usually suspended above the product conveyor and/or tray conveyor.

Due to the continuously moving picking surface and thus pick-up positions of the products, which are usually irregularly positioned on it, the tools attached to the robots must be movable in all three spatial directions and, in addition, the tool must often be able to perform a rotational movement around the vertical axis.

Together with the necessary drive of the tool attached to the robot, this requires complex and expensive robots and results in high costs of such a transfer system.

A further disadvantage is that all drives are located above the product, from where dirt can fall down, and long robot arms and thus a lot of inertial mass must be accelerated during operation of the robot, which requires strong drives on the one hand and a stable machine frame on the other.

SUMMARY OF THE INVENTION

It is therefore the object according to the invention to provide a transfer system especially suitable for the transfer of hygienically critical food products, which is simple, low-maintenance, easy to clean and inexpensive to produce, as well as a method for its operation.

With regard to the transfer method of products from a picking surface to a depositing surface by means of a robot, this object is solved by the fact that the transfer from the picking surface to the depositing surface is carried out by pivoting only one pivot arm of the robot and for this purpose preferably the robot base of the robot—at least between the transfer operations and/or during the transfer operation—is moved in or against the transport direction of the picking surface and/or the depositing surface in a controlled manner.

Preferably, the robot base is moved in a controlled manner in the transport direction at a level below the picking and depositing surfaces.

On the one hand, this makes the construction of the robot very simple, as it only requires a single robot pivot arm that can be pivoted about a single pivot axis and, on the other hand, only the robot has to be able to move in the direction of transport in a controlled manner.

On the other hand, this solution is very hygienic, because when the robot base moves under the picking surface and/or the deposit surface, dirt such as abrasion cannot fall on the product due to gravity, since the product is located further up.

Above these surfaces there are so few parts that the probability of heavy wear and falling parts is very low.

Preferably, at least the pickup surface for the products in the direction of transport is usually always motion, even during the pickup of products, so that the robot base—possibly at a slightly lower speed than the pickup surface—moves in the same direction as the latter.

Preferably, the robot is then moved in the direction of transport during periods in which the product flow/inflow along the picking surfaces per unit of time is greater than the transfer quantity per unit of time that can be handled by the robots. In periods of time when the product flow/inflow is less than the manageable transfer quantity per time unit, at least one of the robots is moved back against the transport direction of the product belt.

This method is therefore particularly suitable for tasks where the product flow is not uniform but fluctuates periodically. For example, for slices of meat produced by slicing loaves of meat upstream of the transfer system and the transfer process, so that the product flow is interrupted during the times when the next loaf is being added to the slicing machine.

Preferably, the depositing surface is also moved in a controlled manner. Preferably parallel to and in the same transport direction as the picking surface, whereby it can stand still during the depositing process of a product on the depositing surface, can be stopped, especially for a short time, but can also be moved further.

Preferably, the depositing surface and the picking surface are arranged at the same height.

With regard to the transfer system, this object is solved by the fact that in a transfer system according to the generic term of claim 1, the robot is movable in the main direction of extension of the picking surface, the direction of transport, and the at least one robot has a robot arm which is pivotable about an upright pivot axis, in particular has only one pivotable robot arm, except for a gripper which is attached to this robot arm away from its pivot axis and is movable in height.

This results in a particularly simple construction of the robot and thus an overall simple and cost-effective transfer system.

The upright direction is preferably vertical, in order to avoid one-sided loads on certain components of the robot, especially the axial bearings, as far as possible.

The directions of extension of the picking surface preferably run at right angles to the upright direction, especially the vertical, so that the receiving surface is preferably horizontal.

The depositing surface preferably runs parallel to the picking surface, if necessary at the same height as the picking surface.

This simplifies the computing effort for the control of the robots by the controller.

Preferably, the picking surface on which the products lie and are delivered is movable in the direction of transport and it is usually the upper side of a product conveyor, especially a conveyor belt.

The same may also apply to the depositing surface on which the products are placed directly or in a tray located on the depositing surface or in the cavities of a film band or other identifiable depositing positions.

As a result, these depositing positions move parallel and always at the same distance to a corresponding product and preferably also in the same direction if a synchronous transfer system is involved.

The pivot arm is supported by a robot base, against which it can be pivoted. The robot base can be moved by means of a robot conveyor in a robot transport direction parallel to the transport direction of the product belt.

Preferably, the robot base—viewed in the transport direction of the robot base—is arranged in the width range between the outer edges of the picking surface facing away from the deposit surface on the one hand and the depositing surface on the other, preferably below the picking surface and/or the depositing surface.

On the one hand, this keeps the width of the transfer system as small as possible and, due to the arrangement underneath these surfaces and impurities resulting from the operation of the robot conveyor cannot fall on the products due to gravity.

The robot transporter can primarily consist of a robot guidance along which the robot base is guided in the robot transport direction, whereby each robot can have its own longitudinal motor, which for example drives a drive pinion that engages with a rack that is part of the robot guide and runs along it. This makes it very easy to move the individual robots independently of each other.

However, the robots can also each be firmly connected to a finite or endlessly circulating tension element and this tension element can be moved in the robot transport direction in a controlled manner by means of a longitudinal motor, both in and against the transport direction.

The robot base, which is guided below the height level of the depositing surface and/or picking surface, carries a support column which projects upwards to above the level of these surfaces, in the upper area of which the pivot arm, which projects transversely to the upright direction, in particular to the vertical, in which the support column extends, projects and can be pivoted about an upright axis.

The support column and swivel arm can form a unit which can be pivoted around the upright axis relative to the robot base or the robot base and support column can form a unit relative to which the pivot arm can be pivoted around the upright axis.

The gripper attached to the free end of the pivot arm, which is intended to grasp the products lying below it on the picking surface and transfer them to the depositing surface, must first be able to lift them from the picking surface and then lower them onto the depositing surface.

For this purpose, either the gripper is designed to be height-adjustable relative to the pivot arm, for example by means of a gripper column, with which the distance between the robot base and the pivot arm can be changed in a controlled manner, or the pivot arm is designed to be height-adjustable relative to the robot base, for example by means of the support column in between.

The height motor, which adjusts the height position of the gripper, and the pivot motor, which adjusts the swivel position of the pivot arm, are each preferably arranged on the robot base, from where the movement is transmitted to the gripper or the pivot arm by means of a drive train in order to keep their mass to be moved low.

If a rotary motor is available to rotate the gripper about the upright axis in a controlled manner, and thus also a product held by it and/or a tool motor is available to actuate the gripper or another tool, these are preferably also arranged on the robot base.

In this way, the robots are very light, especially with regard to their masses to be moved during operation.

However, since the robot base should be able to move over a certain distance, the transfer area, at controlled and/or preferably almost unchanged speed in the robot transport direction until the product flow decreases or is interrupted, the robot base only needs to be accelerated at relatively long intervals with moderate acceleration values.

DESCRIPTION OF THE SEVERAL VIEWS OF THE DRAWINGS

In the following, an advantageous embodiment of the present invention will be explained in more detail making reference to a drawing, in which the individual figures show.

DETAILED DESCRIPTION OF THE INVENTION

Figure 1:
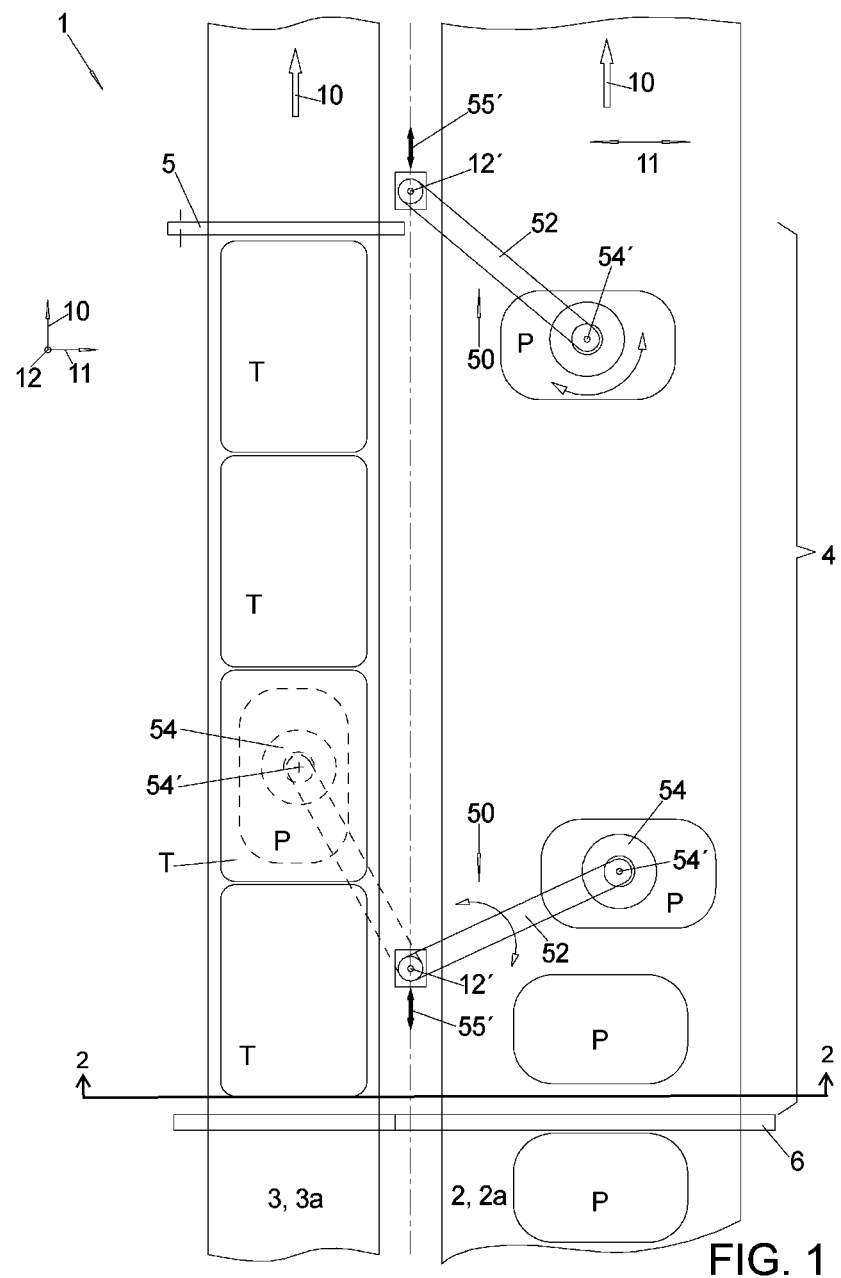
FIG. 1 is a schematic top view of one embodiment of a transfer system in accordance with the teachings of the present disclosure showing a portion of the length of the transfer system.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

As in most transfer systems, a product conveyor 2 and a tray conveyor 3 run next to each other, whereby on the upward facing picking surface 2a—the top of the upper strand of this endless circulating product conveyor 2—the in this case disc-shaped products P are delivered in a transport direction 10, which is the main direction of extension of this product conveyor 2.

On the depositing surface 3a—the upper side of the upper strand of the tray conveyor 3—trays T, open at the top, are transported into which in this case only one product P is to be deposited at a time, but of course this can also be several products P for other applications. In this case, the trays T are both delivered and removed in the same transport direction 10 as the products P.

The picking surface 2a and the depositing surface 3a are here aligned with each other at the same height and define the working plane 13, if the two surfaces are not at the same height, the higher of the two defines the working plane 13.

In this case, two robots 50 are shown one behind the other in transport direction 10, each of which can lower a gripper or suction cup 54 onto the top of a product P resting on the picking surface 2a, pick up the product P, lift it up, position it over a tray T by pivoting the pivot arm 52 of the robot 50 and align the rotational position of the product P for this purpose and then place it in the tray T.

In the present case the products P are gripped while the support surface 2a continues to move, while the trays T stand still when a product P is deposited, since the trays T delivered in the transport direction are accumulated on a barrier 5, which is located approximately at the end of the transfer area 4 and then transported away in transport direction 10.

However, the insertion into the trays T can also be done while the trays T are running.

Transfer area 4 is defined as the section in transport direction 10 of the products P, whose beginning in transport direction 10 is the most upstream product position on the picking surface 2a that the most upstream robot 50 can reach and whose end is the most downstream product position on the support surface 2a that the most downstream robot 50 can reach on the picking surface 2a.

Figure 2:
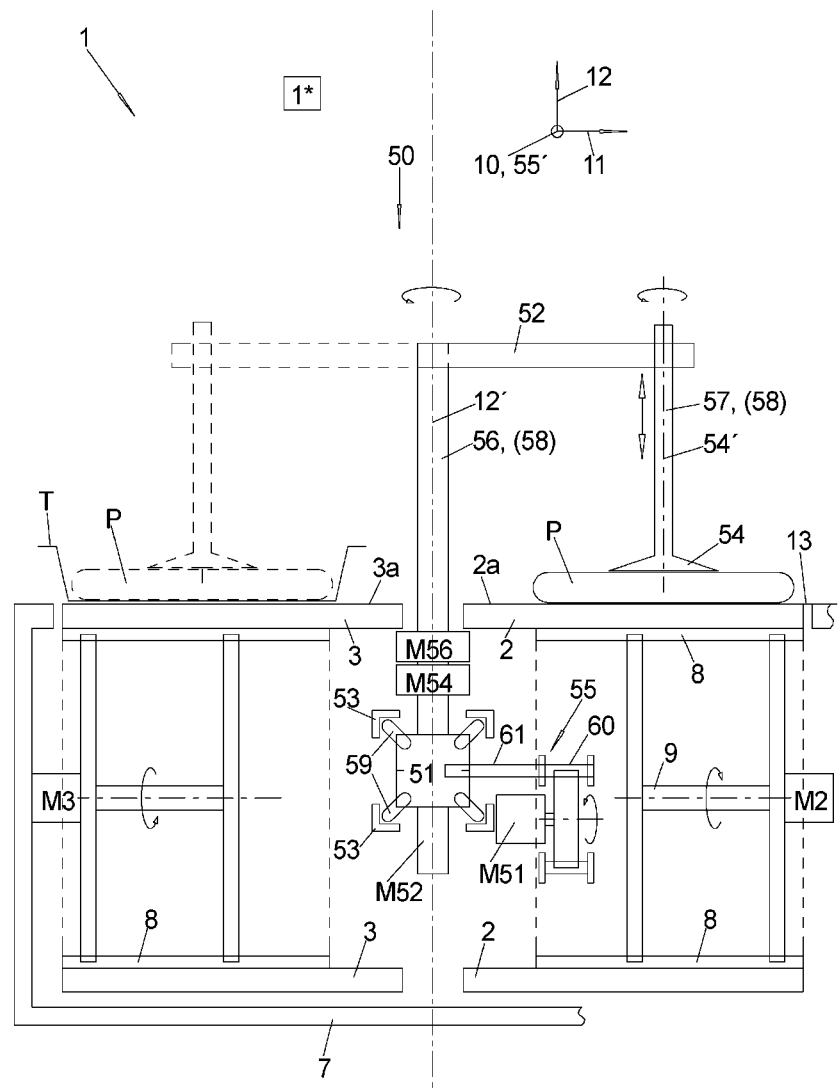
FIG. 2 is a schematic sectional view of the transfer system of FIG. 1 cut along the line 2-2.

As best shown in FIG. 2, the first inventive step of this transfer system is that as much of each robot 50 as possible, in particular its moving parts or its motors, is located below the picking surface 2a and/or the depositing surface 3a, so that any dirt produced by these underlying components, such as abrasion, cannot fall onto the products P.

Furthermore, each robot is very simply constructed and has only a few components. From a robot base 51, which is located below the working level, a support column 56 projects upwards between the picking surface 2a and the deposit surface 3a, i.e. in this example between the product conveyor 2 and the tray conveyor 3. At the upper end of this support column 56, an approximately horizontally running pivot arm 52 is attached, which can be pivoted around an upright pivot axis 12', usually running in the vertical 12, so that its free end is located either above the product conveyor 2 or the tray conveyor 3.

A gripper column 57 is attached to the free end of the pivot arm 52, which projects downwards from the pivot arm 52 and to whose lower end a gripper 54, here in the form of a suction cup 54, is attached.

The pivot arm 52 can either be pivoted alone about the upright pivot axis 12' in relation to the support column 56, or together with the latter in relation to the robot base 51 about the swivel axis 12', effected by means of a pivot motor M52, which is also arranged below working plane 13, preferably on the robot base 51.

The height adjustment of the gripper 54 can be carried out by either the support column 56 and/or the gripper column 57 being designed as a height-controlled adjustable lifting column 58 by means of a height motor M56, whereby the latter is preferred, since less mass has to be moved vertically. The fact that the lifting column 58 is adjustable in height means that: either the length of the lifting column 58 can be varied, and the other two components attached to it are each fixed in one of the end sections of the lifting column, or the lifting column 58 has a constant length but the attachment point of at least one of the two components engaging it can move along the lifting column 58.

Regardless of this, the height motor M56 which causes this change in height is preferably also located below working level 13, either also on the robot base 51 or in the course of the support column 56, but still below working level 13.

The grippers or suckers 54 can also be rotated around an upright gripper axis 54' to achieve a desired rotational position of the product P attached to it for depositing in tray T.

The rotary motor M54 which causes this is preferably also fixed below working level 13 on the robot base 51 or in the course of the support column 56 and the rotation of this rotary motor 54 is preferably transmitted inside the pivot arm 52 to the gripper column 57, which is rotatably mounted in the pivot arm 52.

In this way, the robot 50 consists of very few individual parts, and in particular has very few bearing points, which in addition are only one-dimensional joints, and of which only very few must be above working level 13.

The other special feature according to the invention consists in the fact that the robots 50, preferably all of them, present in the transfer area 4 are movable in and against the transport direction 10, i.e. they are not only movable with respect to their gripper 54, but the entire robot, at least the support column 56 and in particular also the robot base 51, preferably with all motors of the robot 50, is movable in and against the transport direction 10.

There are different drive options available, but the individual robots should be able to move 50 independently of each other and will generally not be able to overtake each other.

In FIG. 2 the robot base 51 can be moved along a guidance 53, opposite which the robot base 51 is supported, for example, by means of sliding rollers 59. Preferably all robots 50 are guided along the same guidance 53.

The longitudinal movement of the robot 50 and in particular of the robot base 51 is in this case effected by a tension element 60 running endlessly next to or under the guidance 53 in a longitudinal direction 10, for example a belt or a chain which circulates over two turning pulley spaced apart in the transport direction 10, whereby in this case an extension 61 projects from the upper run of the tension element 60 and is coupled to the robot base 51.

The tension element 60 is driven by a longitudinal motor M51, which is operatively connected to one of the two turning pinions. Thus the robot base 51 can be moved in longitudinal direction 10 in a controlled manner.

Both the guidance 53 and the tension element 60 are also located below the working level 13.

The area below working level 13 is preferably covered by a base frame 7 which is closed at the sides and preferably also at the bottom, opposite which both the turning pulleys 8 of tray conveyor 3 and product conveyor 2 are mounted, as well as the turning pulley of the tension element 60.

Preferably, the turning pulley 8 consists of two pulleys spaced apart and operatively connected in transverse direction 11, in order to be able to drive the tray conveyor 3 and/or product conveyor 2 over the width measured in transverse direction 11 by the respective product motor M2 or the tray motor M3 via a shaft 9 connected to both pinions.

In this way, as can be seen in FIG. 1, a robot 50, which cannot move the products P to be moved by it at the same time due to a high delivery density of products P, can run in transport direction 10—at a speed which is usually lower than the delivery speed of the products P—and then, if the quantity of products P delivered per unit of time is less or there is a gap in the product flow, move back again against the transport direction 10, but preferably only within the transfer area 4 and in such a way that no collision with another robot 50 occurs.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

The invention claimed is:

1. A transfer system for transferring products comprising:
   a robot for picking up, transferring and depositing at least one product in a transfer area;
   a picking surface for holding available products in the transfer area;
   a deposit surface for depositing products in the transfer area; and
   a scanner for detecting position and rotational position of the products in the picking surface;
   wherein:
   the robot is movable in a transport direction which is a main direction of extension of the picking surface,
   the robot comprises a support column, a pivot arm attached to the support column and pivotable about a pivot axis extending in an upright direction, a gripper column attached to a free end of the pivot arm away from the pivot axis, and a gripper arranged at a lower end of the gripper column, wherein one of the support column or the gripper column is designed as a lifting column so that height of the gripper is adjustable.

2. The transfer system according to claim 1, wherein the upright direction is vertical, the main direction of extension of the picking surface is at a right angle to the upright direction, the picking surface is horizontal, the depositing surface is parallel to the picking surface and the depositing surface is arranged at a same height as the picking surface.

3. The transfer system according to claim 1, wherein the picking surface is movable in the transport direction, the picking surface is an upper side of a product conveyor, the depositing surface is movable in the transport direction, and the depositing surface is an upper side of a tray conveyor.

4. The transfer system according to claim 1, wherein the robot comprises a robot base supporting the pivot arm, the robot base is movable using a robot transporter in a robot transport direction running parallel to the transport direction, the robot transport direction, when viewed in the transport direction, is arranged in a width range between a first outer edge of the picking surface and a second outer edge of the depositing surface.

5. The transfer system according claim 4, wherein the robot transporter and the robot base are arranged below the picking surface and the depositing surface, and the support column extends in the upright direction between the robot base and the pivot arm, and wherein the upright direction is vertical.

6. The transfer system according to claim 1, wherein the gripper is rotatable about the pivot axis and about a gripper axis.

7. The transfer system according to claim 1, wherein the robot comprises a robot base supporting the pivot arm, and one of a swivel motor or a height motor disposed at the robot base.

8. A transfer method for transferring products from a picking surface to a depositing surface using at least one robot, which for each transfer operation, grips at least one product on the picking surface, lifts the at least one product up, transfers the at least one product to the deposit surface, and deposits the at least one product there, and wherein a robot base of each of the at least one robot is moved in a controlled manner in or against a transport direction at least one of between or during the transfer operations, and wherein product transfer is carried out by pivoting only one pivot arm of each of the at least one robot,
   wherein the picking surface is moved in a controlled manner in the transport direction during the transfer operation, and in time intervals in which product flow along the picking surface per time unit is greater than a transfer quantity per time unit which can be handled by the at least one robot, at least a first robot of the at least one robot is moved in the transport direction, and in periods of time in which the product flow along the picking surface per unit of time is smaller than the transfer quantity per unit of time that can be handled by the at least one robot, at least the first robot is moved against the transport direction.

9. The method according to claim 8, wherein the depositing surface is moved in a controlled manner parallel to the transport direction, wherein the depositing surface is also moved during the transfer operation in a same direction as the picking surface.

10. A method for a transfer operation for transferring products from a picking surface to a depositing surface using at least one robot, the method comprising:
    gripping at least one product on the picking surface;
    lifting the at least one product up from the picking surface;
    transferring the at least one product to the depositing surface;
    depositing the at least one product on the depositing surface;
    carrying out product transfer pivoting only one pivot arm of each of the at least one robot;

moving the picking surface in a transport direction;

moving the at least one robot in the transport direction during the transfer operation and during a period of time in which a product flow along the picking surface per time unit is greater than a transfer quantity per time unit which can be handled by the at least one robot; and moving the at least one robot against the transport direction during a period of time in which the product flow along the picking surface per unit of time is smaller than the transfer quantity per unit of time that can be handled by the at least one robot.

11. The transfer system according to claim 1, further comprising a controller for controlling at least some moving parts of the transfer system.

12. The transfer system according to claim 1, wherein the picking surface is movable in the transport direction, and the robot is movable in the transport direction during a period of time in which a product flow along the picking surface per time unit is greater than a transfer quantity per time unit which can be handled by the robot.

13. The transfer system according to claim 12, wherein the robot is movable against the transport direction during a period of time in which the product flow along the picking surface per unit of time is smaller than the transfer quantity per unit of time that can be handled by the robot.

14. The transfer system of claim 12, wherein the robot comprises a robot base supporting the pivot arm, and the transfer system further comprises a motor that is operable to move the robot base in order to move the robot in the transport direction.

15. The transfer system according claim 6, wherein the upright direction is vertical.

16. The transfer system according claim 7, wherein the robot further comprises one of a turning motor or a longitudinal motor disposed at the robot base.

17. The method according to claim 10, wherein each step of moving the at least one robot comprises moving a robot base of the at least one robot.

18. The method according to claim 10, wherein the depositing surface is moved in a controlled manner parallel to the transport direction during the transfer operation.

* * * * *